United States Patent [19]
Witt

[11] 3,950,316
[45] Apr. 13, 1976

[54] CATALYST SUPPORT FORMED BY ADDING ACIDIC MATERIAL TO SILICA CONTAINING TITANIUM

[75] Inventor: Donald R. Witt, Bartlesville, Okla.

[73] Assignee: Phillips Petroleum Company, Bartlesville, Okla.

[22] Filed: May 3, 1974

[21] Appl. No.: 466,691

[52] U.S. Cl............ 260/88.2 R; 252/430; 252/458; 260/94.9 D; 423/338
[51] Int. Cl.² ... C08F 4/02; C08F 4/24; C08F 10/00
[58] Field of Search.................. 260/88.2 R, 94.9 D; 423/338; 252/430, 458

[56] References Cited
UNITED STATES PATENTS

| | | | |
|---|---|---|---|
| 2,395,524 | 2/1946 | Weiser et al.......................... | 423/338 |
| 2,978,298 | 4/1961 | Wetzel et al......................... | 423/338 |
| 3,862,104 | 1/1975 | Witt............................... | 260/94.9 D |

Primary Examiner—Alan Holler

[57] ABSTRACT

Olefin polymers are made using a chromium oxide catalyst on a support formed by adding an acidic material to a silicate solution containing titanium. This catalyst is capable of producing a polymer of an olefin having a high melt index and is of particular utility in the production of such polymer in a particle-form process.

20 Claims, No Drawings

CATALYST SUPPORT FORMED BY ADDING ACIDIC MATERIAL TO SILICA CONTAINING TITANIUM

BACKGROUND OF THE INVENTION

This invention relates to modified olefin polymerization catalyst supports.

Silica supported chromium oxide catalysts can be used to prepare olefin polymers in a hydrocarbon solution to give a product having excellent characteristics from many standpoints. Molecular weight can be controlled in such processes simply by adjusting the temperature. Supported chromium oxide catalysts can also be used to prepare olefin polymers in a slurry system wherein the polymer is produced in the form of small particles of solid material suspended in the diluent. This process, frequently referred to as a particle-form process, has the advantage of being less complex, but does not produce polymers which are exactly comparable to solution polymers i.e. in molecular weight distribution, for example. In addition, there is an inherent limitation on control of molecular weight through temperature adjustment since excessive increase in the temperature to effect lower molecular weight (higher melt index) polymer causes the polymer to go into solution and thus destroys the particle-form process.

BRIEF SUMMARY OF THE INVENTION

It is an object of this invention to provide a method for producing high melt index polymer in a particle-form process; it is a further object of this invention to provide a polymer produced by a particle-form process which has characteristics associated with solution polymerized polymers; it is yet a further object of this invention to provide an improved support for polymerization catalysts; and it is still yet a further object of this invention to provide improved olefin polymerization catalysts.

In accordance with this invention, a catalyst support is produced by adding an acidic material to a silicate solution containing a titanium compound.

DESCRIPTION OF THE PREFERRED EMBODIMENTS

The acidic material which is used to neutralize the silicate solution can be any acidic material capable of neutralizing sodium silicate to form a gel, such as a mineral acid, carbon dioxide, or an acid salt. Preferred acidic materials are: mineral acids selected from the group consisting of sulfuric acid, nitric acid, hydrochloric acid and phosphoric acid, carbon dioxide, and a salt formed by reacting a water-soluble weak base, preferably ammonia, with one of the above mineral acids. The most preferred acidic material is sulfuric acid, more preferably dilute sulfuric acid having a concentration of 1 to 20, more preferably 2 to 6 weight percent $H_2SO_4$ based on the total weight of $H_2SO_4$ and water. Suitable acid salts include ammonium sulfate, ammonium chloride, and ammonium nitrate.

The concentration of the silicate can vary widely and is interrelated to the concentration of the acidic material in that a more dilute solution can be utilized if a more concentrated solution of acidic material is being employed so as to give the same final concentration of silicon dioxide in the resulting hydrogel. Generally a concentration of 2 to 12, preferably 2.5 to 8, more preferably 2.5 to 3.5 weight percent of $SiO_2$ based on the weight of the water and silica in the final gel are satisfactory.

The silicate can be any alkali metal silicate preferably sodium silicate having the formula $xNa_2O \cdot ySiO_2$ wherein the weight ratio of $y$ to $x$ is within the range of 1.5 to 3.8:1. A similar ratio would apply for potassium salts. The ratio is somewhat more restricted with regard to lithium salts because such salts are not commercially available over this entire range.

The titanium compound must be mixed with the silicate solution as opposed to being in the acidic material. The scope of the preferred titanium compound is rather restricted because it is preferred to have water-soluble as opposed to hydrocarbon-solution materials and also it is preferred to avoid acidic compounds such as titanium trichloride. Broadly any titanium compound which is water-soluble and does not precipitate the silicate, i.e. is non-reactive, is applicable. Exemplary materials are those convertible to titanium oxide on calcination such as $K_2TiO(C_2O_4)_2 \cdot 2H_2O$ (titanium potassium oxalate), $(NH_4)_2 TiO(C_2O_4)_2 \cdot H_2O$, and $Ti_2(C_2O_4)_3 \cdot 10H_2O$.

The acidic material is preferably added to the silicate with moderate to vigorous mixing with a slow rate of addition being preferred. Mixing times of 7 to 120 minutes are satisfactory. For instance addition rates of 0.25 to 17 preferably 0.5 to 15, more preferably 1 to 5 percent of the acidic material per minute are satisfactory. At the lower mixing times the improvement in melt index is less pronounced. Temperatures during mixing can vary widely, temperatures of 33° to 110°F being suitable. Sufficient acidic material is added to bring the pH of the mixture past the point of 10 to 10.5 where the material gels to a final level within the range of 3 to 9, preferably 5 to 8, more preferably 6.0 to 7.

The weight percent of titanium in the final hydrogel will generally be in the range of 1 to 10, preferably 1.5 to 7.5 weight percent based on the weight of $SiO_2$.

After the final pH has been reached, the hydrogel is aged for at least one hour, preferably 1 to 20 hours, more preferably 1 to 10 hours, most preferably 4 to 5 hours. Temperature during aging is preferably within the range of 65° to 200°F, more preferably 150° to 195°F.

Following aging, the gel is agitated to produce a slurry which is washed several times with water and with either an ammonium salt solution or a dilute acid to reduce the alkali metal content of the gel to less than about 0.1 weight percent. While various ammonium salts and dilute acid solutions can be employed, the preferred salts are ammonium nitrate and ammonium salts of organic acids, which salts decompose and volatilize upon subsequent calcination.

Water is removed from the hydrogel in any suitable manner, preferably by washing with a normally liquid oxygen-containing organic compound which is soluble in water, or more preferably by azeotropic distillation employing an azeotrope-forming material, preferably a normally liquid oxygen-containing organic compound which is soluble in water. Suitable oxygen-containing organic compounds include methyl isobutyl ketone, ethyl acetate, secondary butyl alcohol, n-propyl alcohol, isopropyl acetate, and the like. Ethyl acetate is particularly preferred. Generally about 1.2 to about 2 parts by weight of the organic compound is employed per part by weight of the hydrogel to effect the azeotropic distillation. The substantially dried silica xerogel so produced can then be modified by the inclusion of a chromium compound, preferably an organochromium compound dissolved in a non-aqueous solvent such as pentane, hexane, benzene and the like. This solution is added to the substantially dry support and the resulting mixture dried and activated in air at an elevated temperature generally within the range of 500° to 2000°F, preferably 750° to 1650°F for about one-half hour to 50 hours, more preferably 2 to 10 hours. At least a substantial portion of the chromium in low valence states is converted to the hexavalent form. Alternatively, a water-soluble chromium compound can be utilized such as chromium nitrate, chromium acetate, chromium trioxide, and the like. Preferably when a water-soluble chromium compound is used, it is introduced into the hydrogel before forming the xerogel. As a further less preferred alternative, the chromium compound can be in the acidic material.

The catalysts of the invention are primarily for the preparation of polymers in a particle-form process. These polymers are polymers of at least one polymerizable olefin, preferably normally solid homopolymers of ethylene or copolymers of ethylene with another 1-olefin containing 3 to 8 carbon atoms per molecule. As an example, the olefin polymer can be produced from at least one aliphatic mono-1-olefin having 2 to 8 carbon atoms per molecule. Exemplary copolymers include those of ethylene/propylene, ethylene/1-butene, ethylene/1-hexene, ethylene/1-octene and the like. The major portion of said copolymers is derived from ethylene and generally consists of about 95 to 99 mole percent of ethylene. These polymers are well suited for extrusion, blow molding, injection molding, and the like.

The particle-form process in which the catalyst of this invention is of particular applicability is a process in which at least one olefin is polymerized at a temperature within the range of about 150° to 233°F, preferably 190° to 230°F. The catalyst is maintained is suspension and is contacted with the olefin or mixture of olefins in an organic medium at pressures sufficient to maintain the medium and at least a portion of the olefins in the liquid phase. The medium and temperatures are such that the polymer produced is insoluble in the medium and is recovered in the form of solid particles. The organic medium (diluent) is generally a paraffin and/or cycloparaffin having from 3 to 12 carbon atoms per molecule. Representative examples include propane, butane, isobutane, pentane, isopentane, cyclohexane, n-dodecane, methylcyclohexane, and the like. Pressures can range from about 100 to 700 psig or higher, and catalyst concentrations can range from about 0.001 to about 1 weight percent based on the weight of the reactor contents. Hydrogen can be used to modify the molecular weight of the polymers produced in the process, if desired. The process for producing the polymers in particle-form is broadly disclosed in British Pat. No. 853,414, complete specification published Nov. 9, 1960, and later variations are disclosed in Norwood et al, U.S. Pat. No. 3,644,323, issued February 22, 1972, the disclosures of which are hereby incorporated by reference. The catalyst of the invention can also be used in solution polymerizations or gas phase polymerizations, but the unexpected advantage afforded by the catalyst of the invention relates primarily to particle-form polymerizations.

The contacting of the monomer or monomers with catalyst can be effected by any of the techniques known in the art for solid catalysts. A convenient method is to suspend the chromium oxide catalyst in a liquid diluent and to agitate this reaction mixture, thus maintaining the catalyst as a solid suspension in the liquid diluent. Other known catalytic contacting methods such as fixed bed, fluidized bed, gravitating bed, etc. can also be used.

EXAMPLE

A series of runs was made to polymerize ethylene employing the catalysts prepared as described below, using a 2 liter stirred reactor and isobutane as the diluent. The runs were conducted at 230°F at a pressure of 450 psig using about 0.04 – 0.05 grams catalyst per run and the duration of the runs was sufficient to give a productivity of about 5000 g polymer per gram catalyst.

Catalyst A (control) — Dilute (about 13 percent) sulfuric acid solution was added to dilute sodium silicate at room temperature (or 80°F) with vigorous mixing over a period of 29 minutes until a final pH of 6.8 was reached. The calculated silica content of the hydrogel was 3.4 weight percent.

Catalyst B (control) — Dilute sulfuric acid solution (24 g $H_2SO_4$ + 200 ml $H_2O$) containing titanyl sulfate ($TiOSO_4$, containing 12.7 weight percent Ti) was added to dilute water glass over a period of 42 minutes at room temperature with vigorous stirring until a final pH of 6.0 was reached. The calculated silica content of the hydrogel was 2.8 weight percent and the Ti content was 4.5 weight percent, based on dry $SiO_2$.

Catalyst C (control) — Dilute water glass containing 0.72 weight percent dissolved $K_2TiO(C_2O_4)_2.2H_2O$ was prepared by adding 5.5 g $K_2TiO(C_2O_4)_2.2H_2O$ plus 250 g $H_2O$ to 250 g of 44.1 percent sodium silicate further diluted with 250 g $H_2O$ and was added at room temperature with vigorous stirring to dilute sulfuric acid (137 g of a 12 percent $H_2SO_4$ solution further diluted with 375 g of $H_2O$) over a period of 30 seconds until a final pH of 6.2 was reached. The calculated quantity of $SiO_2$ in the hydrogel was 2.3 weight percent and the Ti content was 2.8 weight percent, based on dry $SiO_2$.

Catalyst D (control) — Dilute water glass containing 0.82 weight percent of dissolved $K_2TiO(C_2O_4)_2.2H_2O$ was prepared by adding 5.5 g $K_2TiO(C_2O_4)_2.2H_2O$ in 200 g water to 260 g of a 44 percent sodium silicate solution further diluted with 200 g water and was added at room temperature with vigorous stirring to dilute sulfuric acid (131 g of a 12 percent solution further diluted with 200 g water) over a period of 20 minutes until a final pH of 6.7 was reached. The calculated quantity of $SiO_2$ in the hydrogel was 3.1 weight percent and the Ti content was 2.7 weight percent, based on dry $SiO_2$.

Catalyst E (Invention) — To a flask was added 250 g of a 44 weight percent sodium silicate solution and 200 g of distilled water. To a beaker was added 5.5 g $K_2TiO(C_2O_4)_2.2H_2O$ and 200 ml distilled water. This solution was slowly added to the sodium silicate solution to obtain a clear solution. Dilute sulfuric acid (112 g of about 13 percent $H_2SO_4$ further diluted with 200 g $H_2O$) was added at room temperature to the above-formed solution of water glass containing 0.82 weight percent of dissolved $K_2TiO(C_2O_4)_2.2H_2O$, with vigorous stirring over a period of 20 minutes until a final pH of 6.5 was reached. The calculated quantity of $SiO_2$ in the hydrogel was 3.3 weight percent and the Ti content was 2.5 weight percent, based on dry $SiO_2$.

Catalyst F (Invention) — Dilute sulfuric acid as in Catalyst E was added at room temperature to a vigorously stirred solution of water glass containing 1.2 weight percent of dissolved $K_2TiO(C_2O_4)_2 \cdot 2H_2O$, formed as in Catalyst E, over a period of 22 minutes until a final pH of 6.9 was reached. The calculated quantity of $SiO_2$ in the hydrogel was 2.9 weight percent and the Ti content was 2.9 weight percent, based on dry $SiO_2$.

Each of the hydrogels was aged about 4 hours at about 158°–194°F, filtered, rinsed with distilled water and washed with dilute ammonium nitrate solution (about 1 weight percent $NH_4NO_3$) until substantially free of sodium salts. Each purified hydrogel of catalysts A, B, E and F was treated with an aqueous solution of $CrO_3$ to give 2 weight percent $CrO_3$ based on the dry catalyst weight and each wet gel was dried by azeotrope distillation with ethyl acetate. Each purified hydrogel of catalysts C and D was dried by azeotrope distillation with ethyl acetate and impregnated with a pentane solution of t-butyl chromate to give the equivalent of 2 weight percent $CrO_3$ based on the final catalyst. All composites were activated for polymerization by calcining in dry air for 5 hours at 1600°F. The melt index of each ethylene homopolymer made over the catalyst is shown in the following table.

Table T

| Catalyst Used | Polymer Melt Index* |
|---|---|
| A | 1.5 |
| B | 2.6 |
| C | 2.3 |
| D | 3.7 |
| E invention | 4.6 |
| F invention | 5.0 |

*Melt index values are adjusted to a productivity of 5000 g polymer per g catalyst.

The results clearly show that invention catalysts E and F employing addition of acid to water glass plus dissolved $K_2TiO(C_2O_4)_2 \cdot 2H_2O$ are superior to catalysts C and D which employ addition of water glass containing a dissolved titanium compound, $K_2TiO(C_2O_4)_2 \cdot 2H_2O$, to an acid solution. Additions of solutions were made over a relatively long time period of about 20–40 minutes except for Catalyst C in which a 30 second addition period was employed, hence the melt index of polymer made over that catalyst is not directly comparable with the others. The results also show that although titanium is required to obtain catalysts capable of giving high melt index polymers, it is essential in forming the cogels of the invention that the titanium compound is incorporated in the water glass solution rather than in the acid solution.

With respect to control runs C and D, it is noted that with longer mixing times than those and herein it is possible to achieve higher melt indices than the 2.3 and 3.7 obtained in the above control runs. For instance, with approximately a one hour mixing time, melt indices in the range of 3.7 to 4.9 can be obtained; however, the comparison between control run D and invention runs E and F are based on comparable addition times and thus demonstrate the dramatic improvement in melt index obtainable in accordance with the invention.

While this invention has been described in detail for the purpose of illustration, it is not to be construed as limited thereby but is intended to cover all changes and modifications within the spirit and scope thereof.

What is claimed is:

1. A method of preparing a silica-containing catalyst support comprising:
   a. mixing a water soluble titanium compound with an alkali metal silicate solution, said titanium compound being non-reactive with said silicate;
   b. adding an acidic material to said silicate solution containing said titanium compound to form a hydrogel;
   c. aging said hydrogel for a time greater than 1 hour;
   d. washing said thus aged hydrogel with either an ammonium salt solution or a dilute acid to produce a substantially alkali metal-free hydrogel;
   e. forming a mixture comprising said thus washed hyrogel and a normally liquid oxygen-containing, water soluble organic azeotrope-forming compound; and
   f. separating said organic compound and water from said mixture to form a xerogel.

2. A method according to claim 1 wherein said xerogel is heated to a temperature within the range of 500° to 2000°F for a time within the range of ½ to 50 hours.

3. A method according to claim 2 wherein said acid contains a chromium-containing compound.

4. A method according to claim 2 wherein said hydrogel is impregnated with a chromium-containing compound prior to forming said xerogel.

5. A method according to claim 4 wherein said chromium compound is an aqueous solution of chromium trioxide.

6. A method according to claim 2 wherein said xerogel is impregnated with a chromium compound prior to heating to said temperature of 500° to 2000°F.

7. A method according to claim 6 wherein said chromium compound is a hydrocarbon solution of t-butyl chromate.

8. A method according to claim 2 wherein said non-reactive titanium-containing compound is a compound convertible to titanium oxide upon calcination.

9. A method according to claim 2 wherein said acidic material is a sulfuric acid solution.

10. A method according to claim 2 wherein said non-reactive titanium compound is $K_2TiO(C_2O_4)_2 \cdot 2H_2O$.

11. A method according to claim 2 wherein said silicate solution is sodium silicate of the formula $xNa_2O \cdot ySiO_2$ wherein the ratio of y to x is within the range of 1.5:1 to 3.8:1.

12. A catalyst support produced by the method of claim 1.

13. A catalyst produced according to the method of claim 4.

14. A catalyst produced according to the method of claim 5.

15. A process which comprises contacting an olefin with a catalyst comprising an activated chromium oxide supported on a silica-containing base prepared by:
   a. mixing a water soluble titanium compound with an alkali metal silicate solution, said titanium compound being non-reactive with said silicate;
   b. adding an acidic material to said silicate solution containing said titanium compound to form a hydrogel;
   c. aging said hydrogel for a time greater than 1 hour;
   d. washing said thus aged hydrogel with either an ammonium salt solution or a dilute acid to produce a substantially alkali metal-free hydrogel;

e. forming a mixture comprising said thus washed hydrogel and a normally liquid oxygen-containing, water-soluble organic azeotrope-forming compound;

f. separating said organic compound and water from said mixture to form a xerogel.

16. A process according to claim 15 wherein said olefin is at least one aliphatic mono-1-olefin having 2 to 8 carbon atoms per molecule.

17. A process according to claim 15 wherein said olefin is ethylene and another 1-olefin, and said polymer consists of 95 to 99 mole percent ethylene.

18. A method according to claim 15 wherein said contacting is carried out in a liquid diluent at a temperature such that at least a substantial part of polymer produced is insoluble in said diluent.

19. A method according to claim 15 wherein said contacting is carried out in a liquid diluent at a temperature within the range of 150 to 233° F, substantially all of said polymer is in particle-form, and said diluent is a paraffin or cycloparaffin or mixture thereof having from 3 to 12 carbon atoms per molecule.

20. A method according to claim 19 wherein said diluent is isobutane.

* * * * *